United States Patent [19]
Tuma et al.

[11] Patent Number: 5,471,867
[45] Date of Patent: Dec. 5, 1995

[54] INVENTORY RECONCILIATION FOR ABOVE GROUND STORAGE TANKS

[75] Inventors: John E. Tuma, Cypress; Glenn A. Kauffman, Pasadena; Barry N. Williams, Rosharan, all of Tex.

[73] Assignee: Tanknology Corporation International, Houston, Tex.

[21] Appl. No.: 173,826

[22] Filed: Dec. 27, 1993

Related U.S. Application Data

[63] Continuation-in-part of Ser. No. 928,502, Aug. 11, 1992, abandoned.

[51] Int. Cl.$^6$ ........................................................ G01M 3/26
[52] U.S. Cl. ........................ 73/49.2; 73/40.5 R; 73/290 R
[58] Field of Search ........................... 73/49.2 T, 49.2 R, 73/1 H, 40.5, 302, 290 R, 427, 299; 417/38, 2, 8, 63; 141/83, 65, 94, 98

[56] References Cited

U.S. PATENT DOCUMENTS

| | | | |
|---|---|---|---|
| 4,297,081 | 10/1981 | Irvin | 73/1 H |
| 4,409,833 | 10/1983 | Thomson et al. | 73/302 |
| 4,474,054 | 10/1984 | Ainlay | 73/49.2 |
| 4,561,291 | 12/1985 | Ainlay | 73/49.2 |
| 4,638,662 | 1/1987 | Watson | 73/1 H |
| 4,791,814 | 12/1988 | Nee | 73/49.2 |
| 4,840,056 | 6/1989 | Fernandez et al. | 73/1 H |
| 4,993,257 | 2/1991 | Lagergren | 73/49.2 |
| 5,052,215 | 10/1991 | Lewis | 73/49.2 |
| 5,088,317 | 2/1992 | Jensen | 73/49.2 |

OTHER PUBLICATIONS

*Horner EZY–CHEK™ Leak Detector* advertising brochure, Horner Creative Metals, Inc., Saginaw, Mich. (date unknown, but known to be prior art).

*Liquid Level Measurement, Controls & Alarms* product catalog, Uehling Instrument Company, Paterson, N.J. (date unknown).

Statutory Invention Reg. No. H1045, Wilson, published May 5, 1992.

Pp. 5–24 (and two pages of drawings) of technical brochure obtained in May of 1992 from Paroscientific, Inc. (date unknown).

*Primary Examiner*—Hezron E. Williams
*Assistant Examiner*—Helen C. Kwok
*Attorney, Agent, or Firm*—Vaden, Eickenroht, Thompson & Feather

[57] ABSTRACT

A system for inventory reconciliation and leak detection of particular utility in liquid storage tanks such as the terminal facilities that are used for the storage and distribution of gasoline. The system has the ability to monitor the inventory of several different liquid products on hand at such a facility, account for product deliveries and product dispensations (e.g., to tank trucks which deliver the product from the terminal facility to a gasoline service station), and to continually check the volume of each product dispensed against the inventory on hand so as to provide a real-time system for detecting leaks from the tanks containing each product, losses due to evaporation, volume discrepancies from flow meters which are out of calibration, and other irregularities. The system is non-volumetric in that it operates by measuring the differential pressure in the liquids contained in each storage tank, converting pressure to volume and correlating any change in the volume of inventory of each product to the amount of liquid delivered and/or dispensed, and includes corrections for the effect of temperature on the volume measured by the in-line flow meter, or totalizer, for each product.

3 Claims, 4 Drawing Sheets

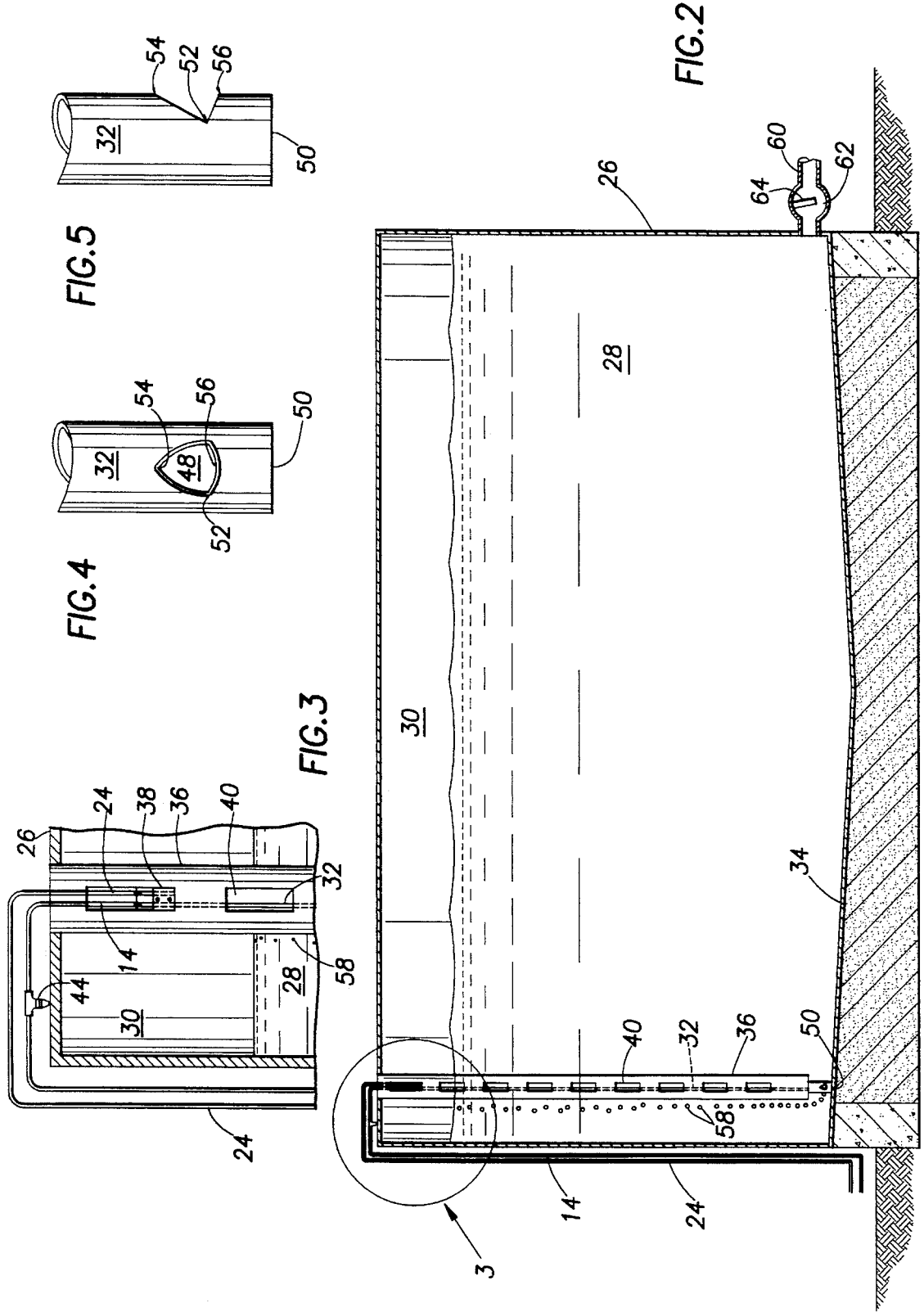

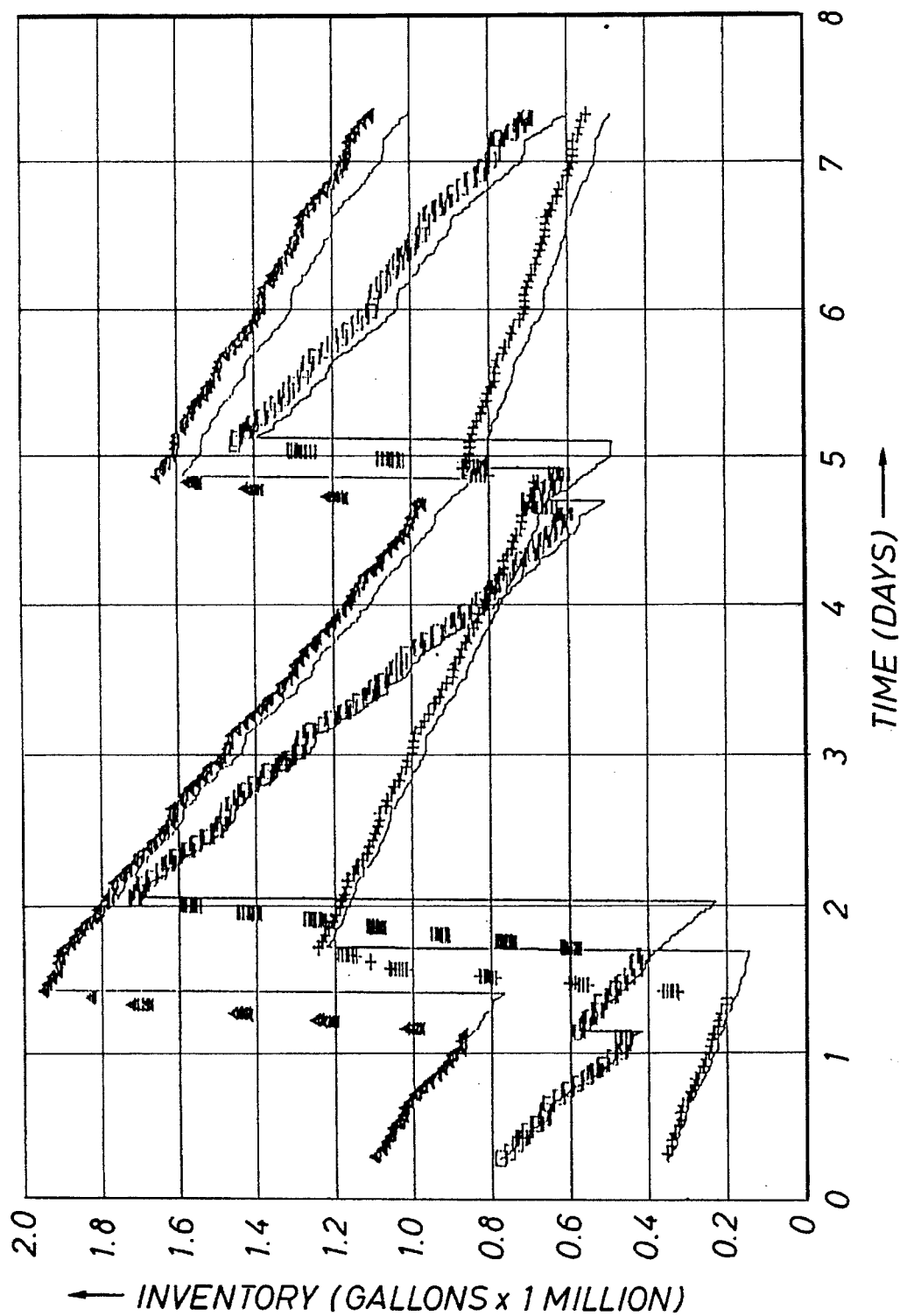

INVENTORY RECONCILIATION FOR ABOVE GROUND STORAGE TANKS

This application is a continuation-in-part of application Ser. No. 07/928,502, filed on Aug. 11, 1992, now abandoned.

BACKGROUND OF THE INVENTION

The present invention relates to an apparatus and method for reconciling inventory with the volume of liquid dispensed from an above-ground storage tank (AST). In more detail, the present invention relates to a non-volumetric system for continuously monitoring the on-hand inventory in an AST and comparing the on-hand inventory to the amount of liquid that has been introduced into or dispensed from the AST at any given time to determine, for instance, the volume of liquid that has been lost from the AST or associated valves and piping, or through evaporation, and for providing inventory control.

Environmental awareness and concern for the economic loss from lost product has resulted in a relatively recent emphasis on insuring the tightness of liquid storage vessels. Of primary concern is the potential for contamination of underground water supplies caused by leaking gasoline or other refined petroleum products. In response to political pressures exerted by environmental and other interest groups, governmental authorities have imposed strict controls on the operation of such facilities to prevent contamination and to help arrest the deteriorating state of the environment.

Enforcement of these regulations has created a new and significant demand for testing procedures and equipment capable of detecting ever smaller amounts of leaking gasoline and other volatile organics. For instance, current United States governmental regulations specify that no leakage is allowable from an above ground storage tank and define a leak as a loss greater than 5 gallons per hour. It is expected that future standards will be even lower.

Most of the equipment and procedures currently known in the art for testing above ground storage tanks are not sufficiently accurate, and lack the greater resolution and precision required, to test against lower standards. Improved methods such as that described in U.S. Pat. No. 4,462,249 have made it possible to test underground storage tanks for leaks even smaller than 0.1 gal/hr, but so far as is known, no methods capable of such precision are available for testing above ground tanks for such leaks.

There are economic incentives to reduce the loss of product as well as the regulatory requirements. Lost product (through leakage or evaporation) cannot be sold to the consumer; further, the air pollution authorities of many states charge the operators of ASTs for evaporative losses. These charges are calculated from standard formulas based on the nature of the product in the tank, tank type, and tank geometry, but the formulas are only approximations of actual loss and may or may not accurately describe a particular AST. So far as is known, no method is currently available for measuring actual loss due to evaporation, and for those tanks with minimal evaporative loss, the operator could literally save thousands of dollars simply by demonstrating actual loss to the environmental authorities which charge such fees.

The difficulty with the testing of above ground tanks has been recognized for a long time. The diameter of such tanks is such that the drop in liquid level from a leak is barely perceptible because it is such a small portion of the total volume of the liquid in the tank. As noted in U.S. Pat. No. 3,062,994, in a tank having a diameter of two hundred feet, 10,000 gallons of liquid must be lost for the level to drop by 0.5 inches. Even if the capability existed to measure such volumes accurately, a 0.05 inch decrease in the liquid level (and assuming a linear correlation between liquid level and volume), would evidence the loss of 1,000 gallons, which is a leak which would be considered a major environmental incident by current criteria.

The patent literature evidences many attempts to overcome the difficulty of such volumetric measurements. For instance, U.S. Pat. No. 5,052,215 describes a method by which fluid is injected in the base beneath an above ground storage tank to enhance the rate of leakage from the bottom of the tank; leakage is then detected with acoustic sensors placed around the tank. Another approach is to use volatile liquid tracers as described in U.S. Pat. No. 5,048,324. The patent literature also includes grids or arrays of electronic probes (U.S. Pat. No. 4,646,069) for detecting the presence of the liquid that has leaked from the tank, ducts for conveying the gases from an escaped liquid past a sensor (U.S. Pat. No. 4,618,855), conductive wires which undergo a change in electrical properties when contacted by escaped liquid (U.S. Pat. No. 4,404,516), and reference and sensing electrodes for measuring changes in electric potential in the substrate/soil under the tank caused by escaped liquid (U.S. Pat. No. 4,166,244).

All of these methods described in the patent literature use some mechanism other than direct volumetric measurement of liquid loss to detect the leak and are, therefore, at best just an approximation of leak rate. Further, on information and belief, the results obtained with each of these methods, except perhaps with the method described in U.S. Pat. No. 5,048,324, will depend at least in part upon the amount of liquid in the tank. The hydrostatic pressure from the liquid in the tank varies with the depth of the liquid and it is this pressure, or weight, of the liquid which may cause a tank to leak when full; when the depth of the liquid decreases, the leak may decrease or even cease altogether.

Non-volumetric measurement is almost required of such tests because of the difficulty in detecting changes as small as those noted above in such large volumes of liquid. It is, therefore, a principal object of this invention to provide a non-volumetric method for detecting leaks which does not suffer from the disadvantages and limitations of these prior art methods. It does so by providing a method for detecting a change in the mass of the liquid in the tank resulting from a loss of the liquid through a leak. Mass measurement methods are known in the art. For instance, one method of measuring the mass of the fluid in a tank is to measure the pressure at the bottom of the tank, subtract the barometric pressure on the top of the tank and multiply this difference in pressure by the cross sectional area of the tank. This is an exact method only if the cross sectional area of the tank is uniform and does not change during the test.

To measure the differential pressure at the bottom of the tank, a differential pressure transducer located at the bottom of the tank must be used. This transducer must be able to survive in the environment at the bottom of the tank and must have a reference input from the top of the tank. The only pressure transducers capable of measurements with the required resolution must be exposed to a dry gas such as nitrogen, which is, of course, problematical if the environment in which pressure is being measured is submerged in a liquid. To overcome this difficultly with such mass measurement techniques, one must remove the transducer from the environment by using a bubbler system.

A bubbler system uses a bubble-forming tube which opens at the bottom of a fluid reservoir, a system to force bubbles out of the tube, and the pressure sensor. The bubbles require a particular pressure in order to be forced out of the tube in the bottom of the reservoir. This pressure is equal to the pressure produced by the fluid at the depth of the bubble formation.

Such systems are used for ascertaining and/or monitoring the depth of rivers and lakes in geographical surveying, and also are, on information and belief, used in such applications as monitoring the depth of liquid fuels in holding tanks at power generation facilities. Equipment for such known systems is available from, for instance, Uehling Instrument Company (Paterson, N.J.).

There is, however, a need for greater precision than can be obtained with the use of such known systems, and the present invention meets that need by providing an improvement to such systems which enables not only the detection, but also the quantification, of such leaks with a precision which meets and significantly exceeds applicable governmental regulatory requirements. Further, the present invention provides that information on a real-time basis, allowing the continuous comparison of the volume of liquid in an AST to the volume of liquid dispensed from the AST as obtained from the flow meter on the dispenser. The present invention has particular application to a gasoline storage and distribution facility because it is capable of providing this constant reconciliation of on hand inventory with the liquid volume dispersed from multiple ASTs, e.g., an AST for regular grade gasoline, premium, diesel, etc., but those skilled in the art who have the benefit of this disclosure will recognize that the invention has broad applicability to an liquid storage container which receives and dispenses liquid.

SUMMARY OF THE INVENTION

To meet these objectives, the present invention provides an apparatus for reconciling the volume of liquid dispensed from a liquid storage reservoir with the volume of liquid stored in the reservoir comprised of an inert gas source, a conduit connected to the inert gas source and opening to the bottom of the liquid storage reservoir, a pressure transducer positioned in the conduit, and a volumetric flow meter positioned at the outlet of the reservoir. Means is provided for regulating the flow of the inert gas in the conduit at a level sufficient to overcome the hydrostatic pressure of the liquid in the reservoir at the opening of the conduit, and a computer having a program stored therein performs the mathematical operations for reconciling the volume of liquid dispensed with the measured volume of liquid in the reservoir. The computer program stores data relating the volume of the liquid stored in the reservoir to the pressure measured at the bottom of the reservoir, calculates the volume of liquid dispensed from the reservoir using the data from the flow meter at the outlet from the reservoir, calculates the change in volume resulting from the dispensing of the liquid from the reservoir using the data from the pressure transducer and the volume to pressure correlation table, and compares the calculated liquid volume with the calculated change in volume to measure any error in the calculated liquid volume.

The method of the present invention reconciles the volume of liquid dispensed from a liquid storage reservoir with the resulting change in liquid volume within the reservoir and comprises the steps of storing in a computer tabular data correlating the volume of liquid in the storage reservoir to the pressure at the bottom of the reservoir resulting from the storage of liquid therein, measuring the hydrostatic pressure of the liquid in the reservoir using a pressure transducer positioned in a conduit connected to an inert gas source and opening to the bottom of the reservoir, and calculating the initial volume of the liquid in the reservoir using the data from the pressure transducer and the volume correlation table. The volume of liquid dispensed from the reservoir is measured with a volumetric flow meter positioned at the outlet of the reservoir. The change in the liquid volume in the reservoir resulting from the dispensing of the liquid is calculated using the data from the pressure transducer and the volume correlation table and then compared to the volume of the liquid dispensed to quantify the error in the volume of the liquid dispensed.

BRIEF DESCRIPTION OF THE DRAWINGS

FIG. 2 is a sectional view through an above ground storage tank showing the conduits which run into the tank.

FIG. 3 is a detail view of the internal structure of the storage tank of FIG. 2 at the location circled and designated III in FIG. 2.

FIG. 4 is an enlarged, elevational view of the opening of the gas flow conduit into the liquid stored in a liquid storage reservoir.

FIG. 5 is a side view of the opening of the conduit of FIG. 4.

FIG. 7 is a graph of the volume of liquid dispensed from a liquid storage reservoir such as the AST shown in FIGS. 2 and 3 and the volume of liquid stored in the reservoir.

DETAILED DESCRIPTION OF THE INVENTION

Figure 1:
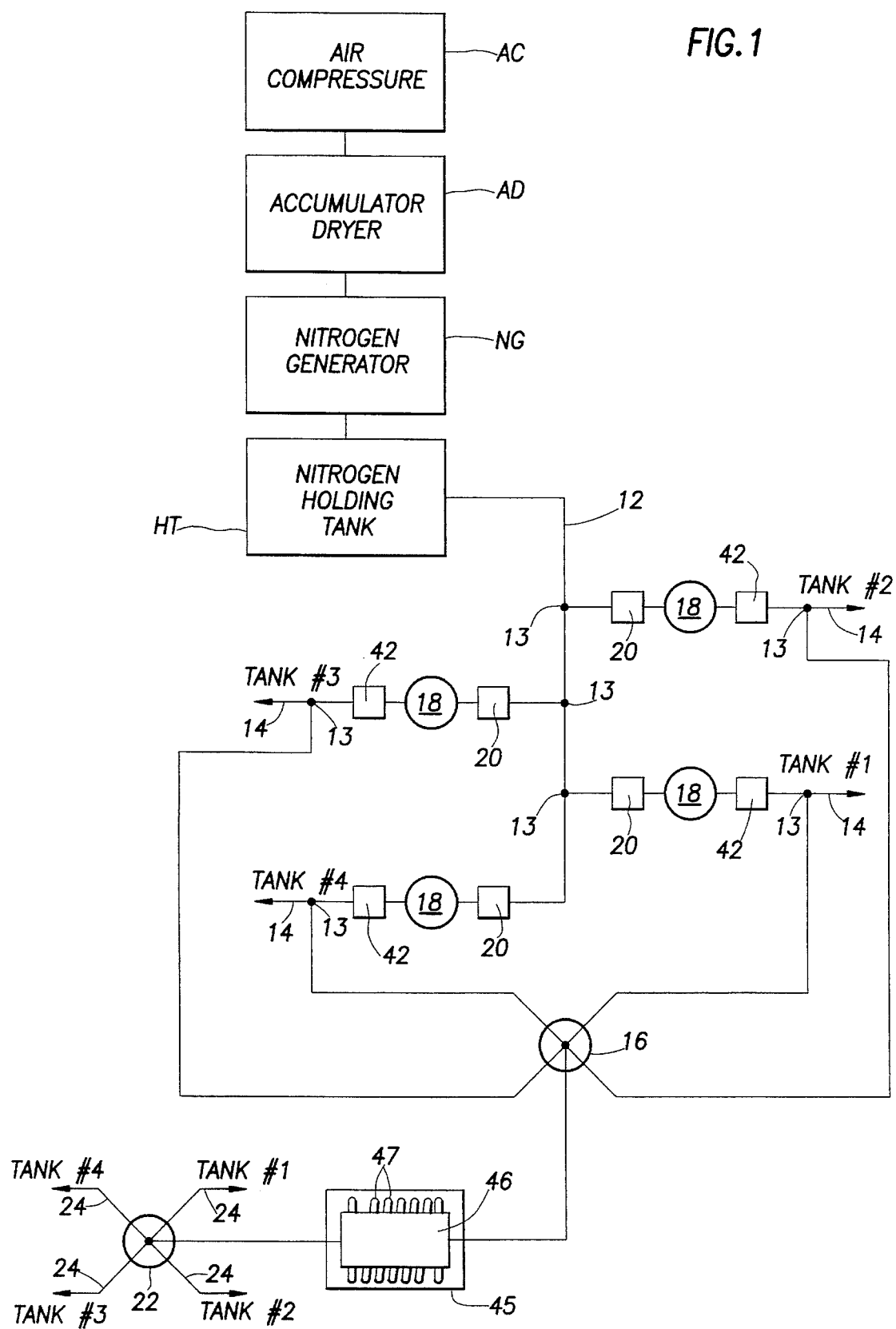
FIG. 1 is a schematic diagram of a presently preferred embodiment of the apparatus of the present invention as it might be installed in a facility having four above ground storage tanks of the type used for storage and dispensing of gasoline.

Referring to FIGS. 1 and 2, a presently preferred embodiment of the apparatus of the present invention will now be described. At a point which may be remote from the particular liquid storage reservoir(s) for which it is desired to monitor inventory, there is situated an air compressor AC which feeds compressed air to an accumulator dryer AD and on into a nitrogen generator NG which produces nitrogen gas and stores that gas under pressure in the holding tank HT. The line 12 (FIG. 1) receives a flow of inert gas, e.g., the nitrogen gas, from the pressurized holding tank HT, which may be provided with a pressure regulator (not shown) or other flow rate control means as is known in the art. In the preferred embodiment shown, the conduit 12 is provided with a plurality of tees 13 for routing the flow of inert gas to a plurality of liquid storage reservoirs (delineated as tank numbers 1–4 on FIG. 1) and a first five way valve 16 for selectively routing the flow to each of the four tanks (not shown). Positioned in each of the conduits 14 into which line 12 splits is a so-called bubbling bottle (bubbler), or sight feed, 18 and needle valve 20 for precise control of the flow in each of the conduits 14. When the pressure of the gas in the conduit 12 is sufficient to overcome the head pressure of the liquid stored in the tanks 1–4, the number of gas bubbles which form in the liquid of bubbler 18 is the same as the number which form in the liquid stored in the respective reservoir to which each of the conduits 14 leads.

Downstream of the five way valve 16 is a second five way valve 22 with conduits 24 leading to each of the four tanks in the same fashion as the conduits 14 and valve 16. Referring to FIG. 2, however, it can be seen that the conduits 14 and second set of conduits 24 lead to different locations in the liquid storage reservoir. That figure shows a liquid storage reservoir such as an above ground liquid storage tank (AST) 26 which is partially filled with liquid 28, the conduit 24 leading into AST 26 opening into the ullage 30 of the AST 26 and the conduit 14 communicating with a tube 32 which opens at the bottom 34 of AST 26. As shown in enlarged detail in FIG. 3, many ASTs such as the AST 26 are provided with a gauging riser 36, and the conduit 14 is preferably mounted to and the tube 32 routed down through the gauging riser 36 by connection to a mounting bracket 38 Which is affixed to the gauging riser in one of the longitudinal slots 40 spaced along the length of the riser. A vacuum break 44 is provided in the conduit 14 for preventing the drawing of the liquid 28 into the five way valve 16.

Referring again to FIG. 1, it can be seen that a plurality of pressure transducers are interposed between the openings of each of the respective conduits 14 (which are open to the hydrostatic, or fluid head pressure of the liquid 28 stored in the AST 26) and conduits 24 (which are open to the ullage 30 of AST 26). More specifically, a low resolution pressure transducer 42 is provided for each of tank #1–tank #4 upstream of five way valve 16 and a single high resolution pressure transducer 46 is positioned in the portion of the conduit between the first and second valves 16 and 22, respectively. Each of the high resolution and low resolution pressure transducers 46 and 42, respectively, is exposed to the difference in pressure between the ullage 28 and the hydrostatic pressure of the liquid 28 in AST 26 when the valves 16 and 22 are opened in sequential fashion to each of tank #1–tank #4 under control of the computer program as described in more detail below. Note that after a particular conduit 14 or 24 is closed off (as the valve 16 or 22 moves to the next tank), the low resolution transducer 42 positioned in that conduit 14 continues to provide data on the pressure held in the sealed system which that particular conduit, transducer and tank form, thereby providing the tank operator with a continuous system for monitoring the tanks.

Referring now to FIGS. 4 and 5, the open end 36 of tube 32 is shown in enlarged detail. As can be seen in these figures, the open end 35 of tube 32 is a blind tube having a notch, or opening, 48 cut in one wall thereof up from the blind end 50 of the tube 32. Although the present invention is not so limited in scope, in the preferred embodiment the opening 48 is cut so as to form approximately a 90° angle at its deepest point 52 and angles (relative to the walls of tube 32) of approximately 30° and 60° at the highest (relative to the bottom 34 of AST 26) point 54 and lowest point 56, respectively. Forming the opening 48 in this manner appears to cause the bubbles 58 to form at the angle at the highest point 54 of opening 48 in a relatively uniform size and shape which is believed to contribute to the increased accuracy of the apparatus and method of the present invention.

In a presently preferred embodiment, the high resolution pressure transducer 46 is a differential pressure transducer such as that available as Model No. 760 from Paroscientific, Inc. (Redmond, Wash.), the operation and function of which is described in detail in D. W. Busse, 109 (No. 5) Mech. Engineering 309–313 (May 1987), hereby incorporated herein in its entirety by this specific reference thereto. This particular differential pressure transducer is sensitive to temperature change, and this temperature sensitivity was found to be sufficient to justify controlling the temperature of the pressure sensor 46. Consequently, pressure sensor 46 is enclosed in an insulated enclosure 45 having a plurality of coils 47 therein for circulation of a controlled temperature fluid. Those skilled in the art who have the benefit of this disclosure will recognize that other differential pressure transducers, such as those available from Uehling Instrument Company (Patterson, N.J.), may likewise be used to advantage with the present invention.

The other components described above are also available from a number of sources. In the preferred embodiment, the low resolution transducers 42 are Model P-155 transducers purchased from Cavlico Corporation (Moorepark, Calif.), the metering valves 20 and bubblers 18 are purchased from the Air Logic Division of Fred Knapp Engraving Company, Inc. (Racine, Wis.), and the five way valves 16 and 22 are five way ball valves purchased from Hoke Valve (Spartanburg, S.C.). Other manufacturer's components may likewise be utilized, and particularly, a complete line of such components is available from the above-mentioned Uehling Instrument Company.

Referring once again to FIG. 2, there is shown an outlet 60 from the AST 26 having a volumetric flow meter 62 positioned therein. The flow meter 62 is provided with a turn counter (not shown) for producing a digital pulse corresponding to each rotation of the meter and a digital temperature probe 64 for monitoring the temperature of the liquid passing through the meter 62. The outputs of the turn counter of flow meter 62, temperature sensor 64, pressure transducer 46, switches for controlling the position of the five way valves 16 and 22, and the motors for opening and closing the needle valves 20 to control the flow of inert gas through conduits 12, 14, and 24 are all connected via RS-485 link (not shown) to a suitable computer (also not shown). The computer is provided with input means in the form of a keyboard (not shown) and a control program (stored in the memory thereof) for storing a table correlating the volume of liquid in the liquid storage reservoir, or AST 26, to the pressure at the bottom of the reservoir resulting from the storage of the liquid 28 therein, calculating the volume of liquid dispensed from the reservoir using the data from the volumetric flow meter 62, calculating the change in the volume of the liquid stored in the reservoir using the data from the pressure transducer 46 and the volume correlation table stored in the memory of the computer, and comparing the calculated liquid volume dispensed with the calculated change in the volume of liquid 28 in the reservoir to indicate the error, if any, in the calculated volume of dispensed liquid.

By reference in the preceding paragraph to the volume correlation table stored in the memory of the computer, reference is being made to a so-called strapping chart, e.g., a table in which measurements of the depth of the liquid stored in the storage reservoir are related to the actual volume of liquid stored in the reservoir. Such correlation tables are known in the art and need not be explained in detail here, but generally, the liquid to be stored in the liquid storage reservoir is introduced into the reservoir in incremental fashion and in precisely metered, temperature-volume corrected quantities, noting as precisely as possible the change in depth resulting from the addition of each increment. The resulting data is either presented in a graph of depth vs. volume or stored in a correlation table in a computer, and the present invention contemplates the use of the latter type of depth-volume correlation.

Those skilled in the art will also recognize that the method and apparatus of the present invention will preferably be used to account for the addition of liquid to the liquid storage reservoir. For instance, in a gasoline distribution terminal which may have several tanks for storage and dispensation of different grades of gasoline and diesel fuel to tank trucks for subsequent delivery to gasoline service stations for purchase by the consumer, product is often introduced into the tanks from a pipeline (not shown). Most tanks are not provided with a volumetric flow meter of the type positioned in the outlet 60 of AST 26 at the inlet from the pipeline such that the only measurement of the volume introduced into the tank is the quantity of liquid reported by the pipeline operator to have been pumped into the pipeline. In that type of facility, the change in the volume of inventory in the AST 26 as calculated from the pressure measurements provides verification of the amount of the product delivery. Indeed, in a test installation of the present invention in the facility described in connection with the description of FIG. 7 below it was determined that there was a discrepancy of approximately 50 gallons per delivery to that particular facility.

Figure 6:
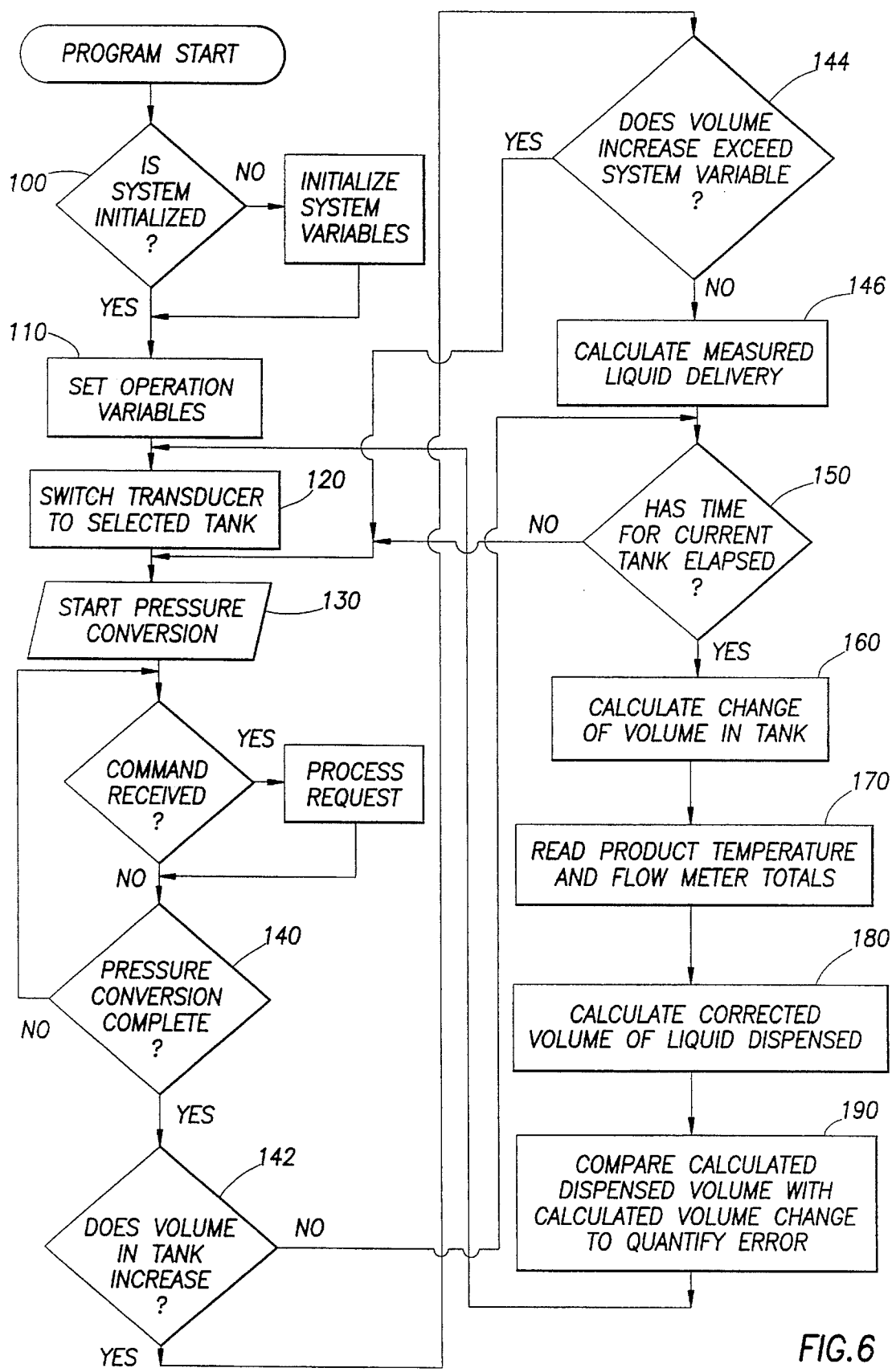
FIG. 6 is a logic diagram for the computer program stored in the memory of a computer utilized for making calculations from the data provided by the other components of the present invention to reconcile dispensed liquid volume with the volume of liquid stored in the AST.

Once the apparatus is set up, certain system parameters must be initialized in the computer (step 100 in FIG. 6) via the keyboard. These include the location of the serial port accepting data from the pressure transducer, the reservoir sampling (integration) time, data storage arrays, files and file names, and data conversion algorithms for producing output in the desired units. In the next step 110, operational variables identifying each reservoir, tank dimensions and geometry, the above-characterized strapping data associated with each reservoir, the total depth of liquid and the depth of water in the reservoir, and the physical characteristics (such as the specific gravity) of the liquid being stored in the tank are entered into the memory of the computer. As the pressure and temperature of the liquid in the reservoir are directly related to the volume of the liquid, errors in the operational variables will translate into errors in the calculated change in volume of liquid in the reservoir.

Once the variables are entered, actual operation is begun by selecting one of the four reservoirs to monitor. The high resolution pressure transducer 46 is selectively connected (step 120) via the respective five-way valves 16 and 22 to the conduits 14 and 24 respectively carrying inert gas to the bottom of each reservoir and the ullage of each reservoir. Thus, the transducer 46 is exposed to the differential pressure across the liquid 28 within the selected reservoir.

At this point, the metering valve 20 of the selected reservoir is opened to initiate the flow of the inert gas via the conduit 14 through bubbler 18 and into the liquid 28 stored within the selected reservoir at the bottom thereof. The flow of inert gas through metering valve 20 is increased under control of the computer to a point at which the pressure in the conduit 14 is just sufficient to overcome the head pressure of the liquid 28 in the reservoir. This pressure is identified by the formation of bubbles in the bubbler 18.

The output signal from the high resolution pressure transducer 46 is the result of the pressure of the inert gas, being substantially equal to the head pressure of the liquid 28 in the reservoir, minus the ullage pressure of the reservoir. The output signal is converted (steps 130, 140) by the computer to the volume of liquid in the reservoir using the volume correlation (strapping) data described above. The output from the pressure transducer is sampled continuously over a selected time interval (e.g., five minutes), and once that time interval has elapsed (step 150), the computer calculates the change in the volume of liquid in the selected reservoir over the specified time interval (step 160).

Data from volumetric flow meter 62 is read by the computer along with the temperature of the liquid passing through the flow meter 62 (step 170). The data is then corrected for thermal expansion of the liquid as a function of the measured temperature (step 180). The computer then compares (step 190) the calculated liquid volume dispensed with the change in the volume of liquid within the reservoir to quantify the error in the calculated volume dispensed, if any.

Referring now to FIG. 7, there is shown a graph which represents the product dispensed and inventory on hand of each of three products (regular, plus and premium gasoline) from a gasoline distribution terminal of the type previously described. That figure presumes an arbitrary start point on day 0 at which there is no discrepancy between on hand inventory and the output reading of the flow meters positioned in the outlet of each of the three tanks of product distributed from that terminal facility and then presents the raw (i.e., data that has not been corrected for temperature volume change) output from those flow meters as individual data points (($\Delta$) for premium, ($\square$) for regular, and (+) for plus). As can be seen, the solid lines immediately below each of the curves represented by the individual data points gradually diverge from the curves of individual data points over the eight days of the test. If such divergence were apparent after correction of the data from the flow meters for temperature, that divergence would provide an indication of a possible leak of product either from the tank or the outlet from the tank (such divergence could also be an indication of the loss of product by evaporation, an improper correction for specific gravity, a temperature sensor or flow meter out of calibration, etc.).

As noted above, the present invention also has the ability to reconcile inventory on hand with the quantity of product introduced into the storage reservoir, and the introduction of product into the tanks tested in FIG. 7 is shown by the two sets of rapid rises in each of the curves which are apparent in the figure. To account for product introduction into the tanks, the volume change calculated from the pressure transducer 46 is sampled (step 142) to determine whether volume increase exceeds (step 144) some predetermined level (one of the system variables described above). In the event of such an increase, it is assumed that a delivery is occurring and volume is calculated until volume stabilizes for a predetermined time interval. An output is then provided for measured product delivery (step 146) and data collection and processing continues to step 150.

Although described in terms of the above-illustrated presently preferred embodiment of the method and apparatus of the present invention, those skilled in the art will recognize from this description that certain changes can be made to the manner in which the component parts, or steps, thereof function to achieve their intended result. For instance, it may be advantageous to correct for the temperature sensitivity of certain pressure sensors 46 mathematically. Also other configurations of the opening 48 in tube 32 can be used to produce bubbles of relatively uniform volume and at the same depth in the liquid 16. All such changes are intended to fall with the spirit and scope of the following claims.

What is claimed is:

1. A method of reconciling the volume of liquid dispensed from a liquid storage reservoir with the resulting change in liquid volume within the reservoir comprising the steps of:

storing, in a computer, a table of tabular data correlating the volume of liquid in the reservoir to a pressure at the bottom of the reservoir resulting from the storage of liquid therein;

measuring a hydrostatic pressure of the liquid in the reservoir using a pressure transducer positioned in a conduit connected to an inert gas source and having an opening near the bottom of the reservoir, the pressure transducer generating data proportional to the measured pressure;

measuring the volume of liquid dispensed from the reservoir with a volumetric flow meter positioned at an outlet from the reservoir, the volumetric flow meter generating data proportional to the measured dispensed volume;

calculating the initial volume of the liquid in the reservoir using the measured pressure data and the volume correlation table;

calculating the volume of liquid dispensed from the reservoir using the measured dispensed volume data;

calculating a change in liquid volume in the reservoir resulting from the dispensing of a quantity of the liquid using the measured pressure data and the volume correlation table; and comparing the calculated liquid volume dispensed with the change in the liquid volume in the reservoir to quantify the error in the calculated liquid volume dispensed.

2. Apparatus for reconciling the volume of liquid dispensed from a liquid storage reservoir with the amount of liquid contained in the storage reservoir comprising:

an inert gas source;

a conduit connected to said gas source and having an opening near the bottom of the liquid storage reservoir;

a pressure transducer positioned in said conduit to measure pressure to generate data proportional to the measured pressure;

a volumetric flow meter positioned at an outlet from the reservoir to generate data proportional to the volume of liquid dispensed therethrough;

means for regulating the flow of the inert gas in said conduit at a level sufficient to overcome the pressure resulting from the volume of liquid in the reservoir at the opening of said conduit;

a computer having a program stored therein for:
 storing a table correlating the volume of liquid in the reservoir to the pressure at the bottom of the reservoir resulting from the storage of liquid therein,
 calculating the volume of liquid dispensed from the reservoir using the data from said flow meter,
 calculating the change in volume resulting from the liquid dispensed from the reservoir using the data from the pressure transducer and the volume correlation table, and
 comparing the calculated liquid volume with the calculated change in volume to measure any error in the calculated liquid volume.

3. Apparatus for detecting a leak in a liquid storage tank comprising:

a source of inert gas;

a flow regulator connected to said gas source;

a first conduit for routing the gas from said gas source to the bottom of the liquid stored in the liquid storage tank, said first conduit terminating in an opening cut into the side wall of said first conduit at angles of approximately 30 and 60 degrees relative to the side wall of said first conduit at the highest and lowest points of the cut, respectively, wherein the gas exits from said first conduit into the liquid at the highest point of the cut;

a second conduit opening into the liquid storage tank above the liquid;

a pressure transducer connected between said first and second conduits; and means for storing data output by said pressure transducer for continually monitoring the pressure in the liquid storage tank, thereby signalling any change in the pressure which could be the result of a leak of the liquid from the liquid storage tank.

* * * * *